CORE SWITCHING METHOD

Filed Sept. 28, 1961 2 Sheets-Sheet 1

RALPH J. KOERNER
ROBERT A. HERMAN
RAYMOND C. CORBELL
INVENTORS

BY Arthur Freilich

ATTORNEY

RALPH J. KOERNER
ROBERT A. HERMAN
RAYMOND C. CORBELL
INVENTORS

BY Arthur Freilich

ATTORNEY

United States Patent Office 3,237,016
Patented Feb. 22, 1966

3,237,016

CORE SWITCHING METHOD

Ralph J. Koerner, Canoga Park, Robert A. Herman, West Los Angeles, and Raymond C. Corbell, Canoga Park, Calif., assignors, by mesne assignments, to The Bunker-Ramo Corporation, Stamford, Conn., a corporation of Delaware Filed Sept. 28, 1961, Ser. No. 141,419
5 Claims. (Cl. 307—88)

Figure 1:
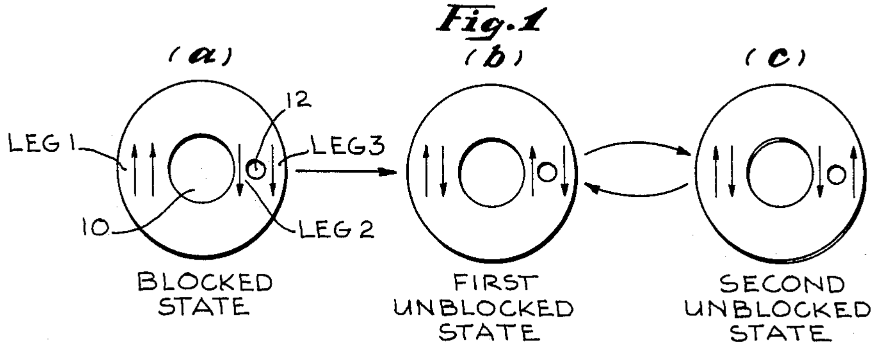

This invention relates to a method and winding arrangement for switching states of multiapertured magnetic core devices and finds particular utility in conjunction with arrays of these devices used, for example, as computer memories and information transfer means.

Various types of multiapertured magnetic cores including the transfluxor, the fluxor, the biax, and others are well known in the prior art. They have been widely discussed in the literature (The Transfluxor, Proceedings IRE, March 1956, J. A. Rajchman and A. W. Lo) as useful in arrays for use as nondestructive readout random-access memories and as crossbar switches (Proceedings of the Western Joint Computer Conference, March 1959, page 112).

When multiapertured cores are operated according to conventional techniques, certain significant limitations are encountered which have prevented them from becoming too widely accepted. Initially, the switching speed of the cores when used in an array has been rather limited. When the array has been used as a memory, the access time to information in a particular cell has limited the rate at which data could be processed in a computer.

Secondly, conventional use of multiapertured core arrays imposes rather severe circuit design requirements inasmuch as drive currents must be carefully controlled so as to fall in a range between a minimum threshold switching value and a maximum value above which unintended switching occurs.

Thirdly, since according to conventional techniques, drive currents must be maintained below certain values, output voltages have also been limited and have been relatively small thereby making the design of sensing equipment critical and somewhat expensive.

In contrast to the limitations of the known techniques for switching multiapertured cores in arrays, it is an object of this invention to provide a method of switching such that significantly higher operating rates than available from prior art techniques are realized.

In addition, it is an object of this invention to provide a method of switching multiapertured cores which permits the use of drive currents having no upper amplitude limit.

It is a still additional object of this invention to provide a method of switching multiapertured cores in an array which permits the utilization of simpler and less expensive drive and sense circuitry.

Briefly, the invention recognizes that by utilizing, in addition to a first drive winding inductively coupled to all first minor core legs in an array row, a second drive winding inductively coupled to all second minor core legs in said row, the cores can be switched from a first to a second unblocked state without affecting cores in any other state by passing a current above a minimum threshold amplitude through the first winding and from a second to a first unblocked state without affecting cores in any other state, by passing a current above a certain minimum threshold amplitude through the second winding.

Figure 2:
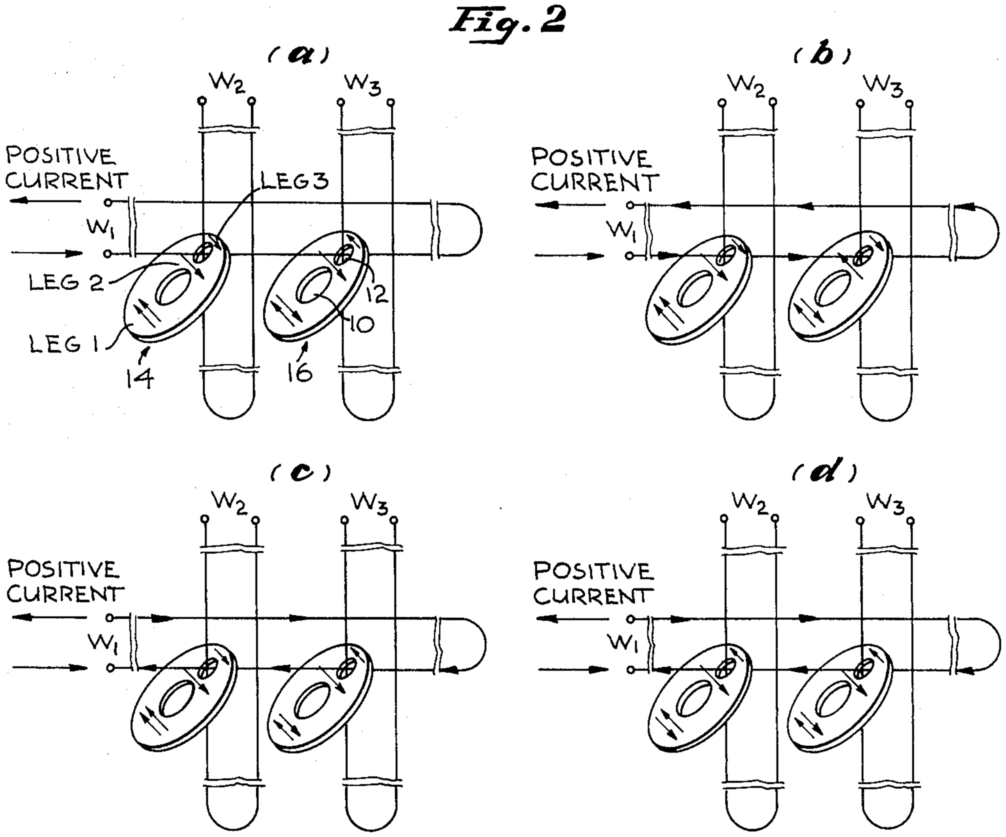
Figure 3:
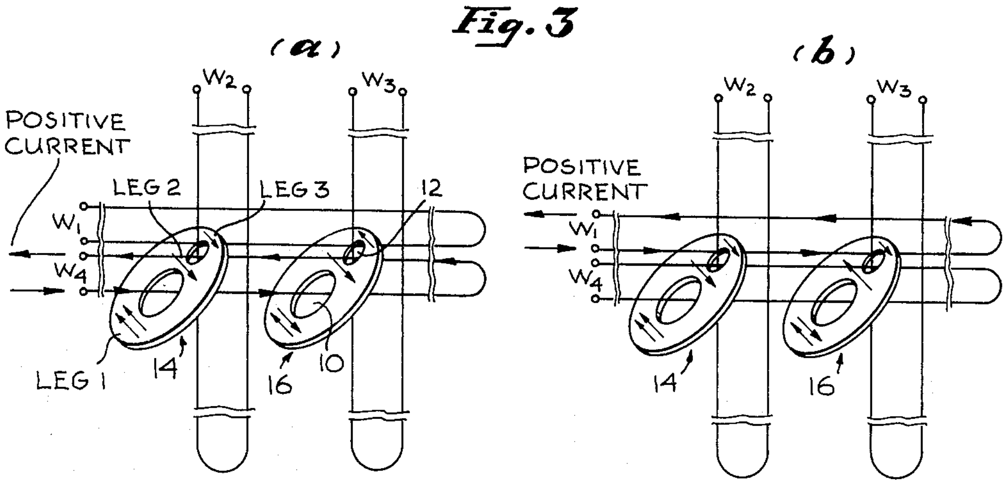
Figure 4:
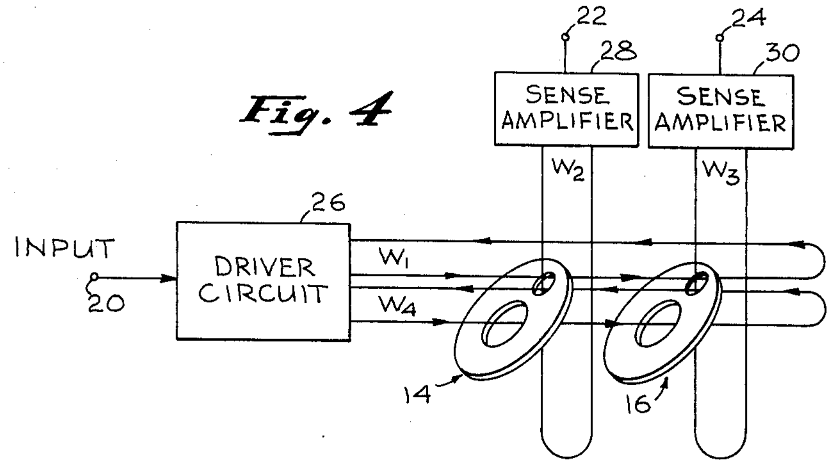
Figure 5:
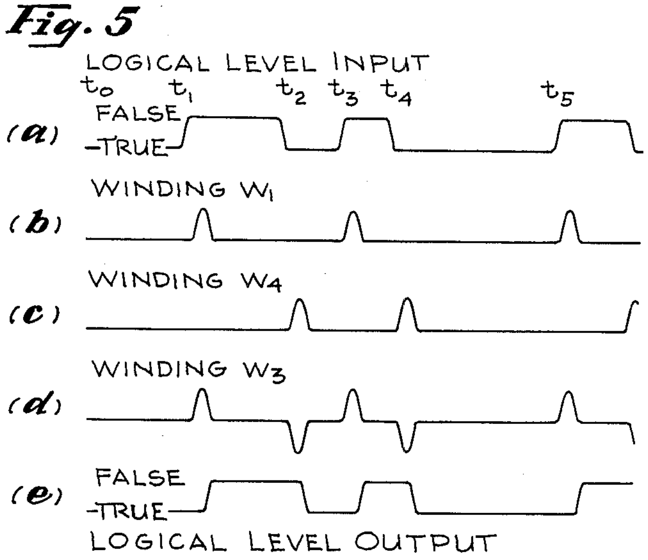

Other objects and advantages, which will subsequently become apparent, reside in the details of circuitry and operation as more fully hereinafter described and claimed, further reference being made to the accompanying drawings forming a part hereof, wherein like identifying numerals refer to like parts throughout the several figures, and in which:

FIGURE 1 includes three schematic diagrams each illustrating a two-apertured core in a different state of magnetization;

FIGURE 2 includes four schematic diagrams, each showing the flux patterns within a pair of adjacent cores in an array row when operated according to prior art techniques;

FIGURE 3 includes two schematic diagrams, each showing the flux within a pair of adjacent cores in an array row when operated according to the method of the invention;

FIGURE 4 is a schematic diagram of a circuit arrangement utilizing the method of the invention; and FIGURE 5 includes illustrations of signals at various points of the circuit of FIGURE 4 plotted as a function of time.

With continuing reference to the drawings, initial attention is called to FIGURE 1 wherein a typical multiapertured core, a two-apertured transfluxor, is schematically illustrated. The transfluxor is made of a ferrite material having a nearly rectangular hysteresis loop. A large circular aperture 10 and a small circular aperture 12 are formed such that the minimum cross-sectional areas of minor legs 2 and 3 are equal and their sum is less than the minimum cross-sectional area of major leg 1.

The principle of operation of the transfluxor may be understood by considering a current through a winding passing through aperture 10 and inductively coupled to leg 1 in such a direction and of sufficient magnitude to produce a saturation of flux in legs 1, 2 and 3 in the clockwise direction. This condition, as shown in FIGURE 1(*a*) will remain even after the current has been removed by virtue of the rectangular hysteresis loop characteristic of the transfluxor. When a current is introduced through a winding passing through aperture 12, and inductively coupled to either leg 2 or leg 3, so as to produce a magnetomotive force around aperture 12 in the counter clockwise direction, the flux in leg 3 tends to reverse. If the amplitude of the current is insufficient to switch flux around the large aperture 10, no flux in leg 3 reverses since the flux in leg 2 is saturated downward. Similarly, when a clockwise magnetomotive force is produced around aperture 12 of insufficient amplitude to switch flux around aperture 10, the flux in leg 2 tends to reverse but cannot since the flux in leg 3 is saturated downward. Consequently, when the core is in the state shown in FIGURE 1(*a*) such that the flux in legs 2 and 3 are saturated in the same direction, the transfluxor is said to be "blocked," i.e., flux reversal around the small aperture 12 is blocked. The blocked state of the transfluxor can easily be detected since the introduction of an alternating magnetomotive force around aperture 12 (of insufficient magnitude to switch flux around aperture 10) switches no flux and produces no output voltage on a sense winding linking either leg 2 or leg 3.

Consider now a current through a winding passing through the large aperture 10 and inductively coupled to either leg 1 or leg 2 which produces a counterclockwise magnetomotive force around aperture 10 of such a magnitude to reverse all of the flux in leg 2 and hence an equal amount of flux in leg 1. The flux in leg 3 remains saturated in a downward direction. This condition is shown in FIGURE 1(*b*). When a current is introduced through a winding passing through the small aperture 12 and inductively coupled to either leg 2 or leg 3, so as to produce a magnetomotive force around the small aperture 12 in a counterclockwise direction, the flux in leg 3 tends to reverse. Since the flux in leg 2 is oriented in an opposite direction from the flux in leg 3, the flux in leg 3 can now reverse producing a corresponding reversal of flux in leg 2. The flux pattern within the core is then illustrated by FIGURE 1(*c*). When a clockwise magnetomotive force is produced around aperture 12, the flux in leg 2 reverses producing a corresponding reversal of flux in leg 3 and returning the state of the core to that shown in FIGURE 1(*b*). When the core is in either of the states illustrated in FIGURES 1(*b*) or 1(*c*), the transfluxor is said to be "unblocked." Hereinafter the state of FIGURE 1(*b*) will be referred to as the first unblocked state and the state of FIGURE 1(*c*) as the second unblocked state. In either unblocked state, flux can be switched around aperture 12 causing the transfluxor to assume its other unblocked state and producing an output voltage (proportional to the rate of flux change) on a sense winding linking leg 2 or leg 3 whose polarity is indicative of the particular unblocked state out of which the transfluxor is being switched. Accordingly, it is apparent that the particular unblocked state of the transfluxor is readily detectable.

Attention is now called to FIGURE 2 illustrating conventional switching techniques and wherein numerals 14 and 16 in each of the diagrams designate any two adjacent multiapertured cores in a rectangular grid pattern. As is apparent from the foregoing discussion, in FIGURE 2(*a*) core 14 is illustrated in the blocked state while core 16 is illustrated in the second unbocked state. Switch winding W1 passes through the small apertures 12 of cores 14 and 16 and is inductively coupled to legs 3 thereof. Sense windings W2 and W3 pass through the small apertures 12 of cores 14 and 16 respectively and are inductively coupled to legs 3 thereof. A current in winding W1 in the positive direction apparently does not alter the state of core 14 and hence no voltage is produced across the terminals of sense winding W2. A current of sufficient magnitude in winding W1 in the positive direction does, however, reverse the flux around aperture 12 of core 16 to cause core 16 to assume the first unblocked state. As the flux reverses, a voltage proportional to the rate of flux change is produced across the terminals of winding W3. The resulting states of the two cores is as shown in FIGURE 2(*b*).

A second current pulse in winding W1 in the positive direction causes no further change in flux pattern in either core and accordingly no output on windings W2 or W3. Until some additional event occurs to change the states of either or both cores 14 and 16, the two cores will remain in the states shown in FIGURE 2(*b*). In spite of the fact that core 16 is in the first unblocked state, no positive current in winding W1 can be used to detect the state until the flux around the small aperture 12 has been "reset."

In order to reset core 16, according to conventional techniques a current passing through winding W1 in a negative direction is used. It is apparent, however, that the negative current must be large enough to switch completely all of the flux around the small aperture 12 of the core 16, yet small enough to prevent any switching in core 14. An appropriate negative current through winding W1 will leave cores 14 and 16 in the states shown in FIGURE 2(*c*). A subsequent current pulse in winding W1 in the positive direction will then produce the same effect as before; i.e., switch core 16 from the second to the first unblocked state and leave core 14 unaffected. Too great a magnitude of current in the negative direction in winding W1 will cause the cores 14 and 16 to pass through the states of FIGURE 2(*c*) and assume the states shown in FIGURE 2(*d*). A subsequent current pulse in winding around the small apertures 12 of both cores 14 and 16, thereby producing output voltage pulses in both windings W2 and W3. This effect, needless to say, is undesirable since the information in core 14, namely, the fact that it was originally blocked, has been destroyed.

Although it is entirely possible to maintain the negative current in winding W1 between appropriate limits such that the cores do not pass from the states of FIGURE 2(*b*) through the states of FIGURE 2(*c*) to the states of FIGURE 2(*d*), in order to do this, relatively expensive driver circuits must be utilized to accurately control the critical magnitude of the current and relatively expensive sense circuits must be utilized inasmuch as the magnitude of the output pulse is very small since it is proportional to the magnitude of the drive pulse. Also, since switching time is inversely proportional to the magnitude of current in winding W1 in excess of the threshold magnitude necessary for switching, the limit on the maximum value of negative current in winding W1 limits the switching speed of the cores.

Attention is now called to FIGURE 3 illustrating the improved switching technique comprising the present invention. In FIGURES 3(*a*) and 3(*b*), cores 14 and 16 again are any two adjacent multiapertured cores in a rectangular array. It will be noted in FIGURE 2(*a*) that core 14 is blocked while core 16 is in the second unblocked state. A current in winding W1 in the positive direction does not alter the state of core 14 and accordingly produces no output across the terminals of winding W2. A current of sufficient magnitude in winding W1 in the positive direction does however reverse the flux around the small aperture 12 of core 16 thereby producing an output across the terminals of winding W3. Core 16 accordingly assumes the first unblocked state illustrated in FIGURE 3(*b*). As indicated previously, a subsequent positive current pulse in winding W1 will cause no further change in flux pattern in either of cores 14 or 16. It is apparent that in order to again obtain an output across the terminals of winding W3, core 16 must be reset. The disadvantages of resetting core 16 by utilizing a negative current through winding W1 have been considered. In lieu thereof, a winding W4 is provided passing through apertures 10 and 12 and inductively coupled to legs 2 of each of cores 14 and 16. A current through winding W4 in a positive direction does not affect core 14 but switches core 16 from the first to the second unblocked state. Since the positive current in winding W4 tends only to further saturate leg 2 of core 14, there is no necessity to maintain the current below any maximum magnitude; i.e., regardless of the magnitude of the current in a positive direction in winding W4, as long as it is above a minimum switching threshold value, no information in either of the transfluxors will be destroyed.

It will be appreciated that the positive current through winding W4 causes the cores 14 and 16 to switch from the states of FIGURE 3(*b*) to the states of FIGURE 3(*a*). By eliminating the requirement that the reset drive current be below a certain maximum value, the necessary drive circuitry can be considerably simplified. It is also pointed out that since higher drive currents can be employed, higher output voltages are available permitting the sense circuitry to be simplified. Perhaps even more significiant, since the switching time is inversely proportional to the excess drive current over the minimum threshold current, the transfluxors can be switched considerably faster (by a factor of 10) than when operated according to the conventional technique described in conjunction with FIGURE 2.

Attention is now called to FIGURE 4 wherein an exemplary and particularly useful application of the afore-described technique of FIGURE 3 is illustrated. In this application, the multiapertured cores 14 and 16 are utilized as an information transfer means, it being desired to couple information from input terminal 20 to either output terminals 22 or 24 via the cores 14 and 16, respectively. A source (not shown) of binary information represented by two distinct voltage levels is connected to input terminal 20 which in turn is connected to the input of driver circuit 26 of the type disclosed in U.S. application for patent entitled Driver Circuit filed by Raymond C. Corbell and Robert N. Mellott on Aug. 25, 1961, Ser. No. 133,844, now Patent No. 3,163,777. Driver circuit 26 has first and second pairs of output terminals which are respectively connected to windings W1 and W4. Winding W1 passes through small apertures 12 in cores 14 and 16 and is inductively coupled to legs 3 thereof. Winding W4 passes through small and large apertures 10 and 12 of cores 14 and 16 and is inductively coupled to legs 2 thereof. Driver circuit 26, in response to a change in voltage level at terminal 20 in a first direction, functions to apply a pulse to winding W1 and in response to change in voltage level in an opposite direction, functions to apply a pulse to winding W4. Sense windings W2 and W3 pass through small apertures 12 of cores 14 and 16, respectively being inductively coupled to legs 3 thereof, and are connected to the input of sense amplifiers 28 and 30, respectively. Sense amplifiers 28 and 30 are of the type disclosed in U.S. application for patent filed by Raymond C. Corbell and Robert N. Mellott on Jan. 31, 1961, Ser. No. 86,163, now Patent No. 3,187,196 and respond to input pulses of one polarity to generate a first voltage level output and to input pulses of an opposite polarity to generate a second voltage level output. The outputs of sense amplifiers 28 and 30 are respectively connected to terminals 22 and 24.

Reference is now made to FIGURE 5 wherein signals at various points in the schematic of FIGURE 4 are illustrated as a function of time. In FIGURE 5(*a*), an arbitrary logical level input at terminal 20 is indicated, it being noted that the input is true between times $t_0$ and $t_1$, $t_2$ and $t_3$, and $t_4$ and $t_5$, and false between times $t_1$ and $t_2$, $t_3$ and $t_4$, and $t_5$ and $t_6$. Driver circuit 26 responds to the input level going from true to false, as at $t_1$, by generating a pulse on winding W1 and the input level going from false to true, as at $t_2$, by generating a pulse on winding W4.

Assume that it is desired to selectively couple input terminal 20 solely to output terminal 24. In order to do this, core 14 should be placed in the blocked state while core 16 should be made to assume an unblocked state which for the present example will be the second unblocked state. The generation of a pulse on winding W1 as indicated at time $t_1$ in FIGURE 5(*b*), causes core 16 to switch from the second to the first unblocked state, thereby producing a positive pulse on the output terminals of winding W3 (FIGURE 5(*d*)) connected to the input of sense amplifier 30. The output of sense amplifier 30 is thereby driven false (FIGURE 5(*e*)) and inasmuch as sense amplifier 30 bears memory, the output on terminal 24 will remain false until a pulse of negative polarity appears on winding W3.

When the input level at terminal 20 goes from false to true (FIGURE 5(*a*)), as at time $t_2$, a positive pulse is generated on winding W4 (FIGURE 5(*c*)) and causes core 16 to switch from the first to the second unblocked state, thereby producing a negative pulse on winding W3 (FIGURE 5(*d*)) and accordingly causing the output of sense amplifier 30 to go from false to true (FIGURE 5(*c*)).

Accordingly, it should be appreciated that the information transfer technique described provides for the transfer of information concerning the changes in level at input terminal 20 rather than the transfer of the level directly. The information transfer through the cores can be accomplished exceedingly rapidly by virtue of the fact that the maximum current that can be driven through windings W1 and W4 is not limited. Moreover, since the pulses of current in windings W1 and W4 each produce a different output, and since each output bears information, no time need be wasted in resetting the cores. It is stressed that this information transfer technique which utilizes the fast switching technique initially described, makes information available at the output terminals 22 or 24 at the earliest time possible after a change at the input terminal 20; i.e., the mode of operation utilizes the change in the input level itself to initiate the transfer through the transfluxor.

From the foregoing, it should be appreciated that applicants have herein disclosed means by which transfluxors in arrays can be switched at higher speeds than heretofore possible and illustrated an exemplary and particularly useful application of the means for permitting extremely fast transfer of information through multi-apertured cores.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention as claimed.

The following is claimed as new:

1. Means for coupling binary input information represented by first and second voltage levels at an input terminal to an output terminal comprising: a multiapertured core having first and second minor flux legs and a major flux leg; a first winding inductively coupled to said first minor flux leg; a second winding inductively coupled to said second minor flux leg; first circuit means connecting said input terminal to said first and second windings for generating a pulse in said first winding in response to a change in input from said first to said second level and for generating a pulse in said second winding in response to a change in input from said second to said first level; a sense winding inductively coupled to one of said minor flux legs; and second circuit means connected to said sense winding and responsive to pulses of one polarity therein for establishing a third voltage level at said output terminal and responsive to pulses of an opposite polarity therein for establishing a fourth voltage level at said output terminal.

2. In combination with a multiapertured magnetic core having first and second minor flux legs and a major flux leg, means for transferring binary input information, represented by two distinct voltage levels, therethrough comprising: a first winding inductively coupled to said first minor flux leg; a second winding inductively coupled to said second minor flux leg; first circuit means for pulsing said first winding in response to a change in input from a first to a second voltage level and said second winding in response to a change in input from said second to said first voltage level; a sense winding inductively coupled to one of said minor legs; and second circuit means responsive to a sense winding pulse of one polarity for generating a third voltage level and to a pulse of an opposite polarity for generating a fourth voltage level.

3. The combination of claim 2 wherein said first and third voltage levels are equal and said second and fourth voltage levels are equal.

4. Means for coupling binary input information represented by first and second voltage levels at an input terminal to selected terminals of a plurality of output terminals comprising: a plurality of multiapertured cores each having first and second minor flux legs and a major flux leg; a first winding inductively coupled to each of said first minor flux legs; a second winding inductively coupled to each of said second minor flux legs; first circuit means connecting said input terminal to said first and second windings for generating a pulse in said first winding in response to a change in input from said first to said second level and for generating a pulse in said second winding in response to a change in input from said second to said first level; a plurality of sense windings, each of said sense windings uniquely inductively coupled to a first minor flux leg; a plurality of second circuit means, each of said second circuit means uniquely connected to a sense winding and responsive to pulses of one polarity therein for generating a first output voltage level and responsive to pulses of an opposite polarity therein for generating a second output voltage level; means uniquely connecting each of said output terminals to a second circuit means; and means for unblocking cores associated with said selected terminals.

5. The combination of claim 4 wherein said second circuit means are bistable.

References Cited by the Examiner

UNITED STATES PATENTS

| | | | |
|---|---|---|---|
| 2,691,156 | 10/1954 | Saltz et al. | 340—174 |
| 2,840,801 | 6/1958 | Beter et al. | 340—174 |
| 2,993,197 | 7/1961 | Broadbent | 340—174 |
| 3,047,843 | 7/1962 | Katz et al. | 340—174 |
| 3,048,828 | 8/1962 | Cataldo | 340—174 |

OTHER REFERENCES

Pages 1 to 20, July 9, 1957, Publication I, Technical Report 329, Massachusetts Institute of Technology, Research Laboratory of Electronics, Cambridge, Mass.

Pages 321 to 332, March 1956, Publication II, Proceedings of the IRE.

IRVING L. SRAGOW, *Primary Examiner.*

UNITED STATES PATENT OFFICE

CERTIFICATE OF CORRECTION

Patent No. 3,237,016 February 22, 1966

Ralph J. Koerner et al.

It is hereby certified that error appears in the above numbered patent requiring correction and that the said Letters Patent should read as corrected below.

Column 4, line 8, after "winding" insert -- W1 in the positive direction will then switch the flux --.

Signed and sealed this 14th day of January 1969.

(SEAL)
Attest:

Edward M. Fletcher, Jr.
Attesting Officer

EDWARD J. BRENNER
Commissioner of Patents